United States Patent
Ota et al.

(10) Patent No.: US 7,538,780 B2
(45) Date of Patent: May 26, 2009

(54) DRAWING PROCESSING APPARATUS, DISPLAY APPARATUS, DRAWING PROCESSING METHOD AND NAVIGATION APPARATUS

(75) Inventors: Takeshi Ota, Kanagawa (JP); Takumi Arie, Kanagawa (JP); Isao Watanabe, Tokyo (JP); Hiroshi Amano, Tokyo (JP); Yuichi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 11/364,193

(22) Filed: Mar. 1, 2006

(65) Prior Publication Data

US 2006/0268017 A1    Nov. 30, 2006

(30) Foreign Application Priority Data

Mar. 10, 2005   (JP)   ............................. 2005-067414

(51) Int. Cl.
    G09G 5/00    (2006.01)
(52) U.S. Cl. .................. 345/619; 345/427; 345/428; 345/473; 345/643; 345/649; 345/660; 345/684; 345/687; 701/200; 701/208; 701/211; 701/212
(58) Field of Classification Search .................. 345/687
    See application file for complete search history.

(56) References Cited

U.S. PATENT DOCUMENTS

| 5,093,669 | A | * | 3/1992 | Kajiyama | .................. 342/457 |
| 6,141,014 | A | * | 10/2000 | Endo et al. | .................. 345/427 |
| 6,388,664 | B2 | * | 5/2002 | Sone | .................. 345/428 |
| 6,621,494 | B2 | * | 9/2003 | Matsuoka et al. | .................. 345/427 |
| 7,412,326 | B2 | * | 8/2008 | Yoshioka et al. | .................. 701/208 |

* cited by examiner

*Primary Examiner*—Antonio A Caschera
(74) *Attorney, Agent, or Firm*—Oblon, Spivak, McClelland, Maier & Neustadt, P.C.

(57) ABSTRACT

A drawing processing apparatus and method wherein scrolling display which provides no sense of incongruity is achieved in 3D display. 3D information is produced using information in a drawing object range extracted as a predetermined range on map data. The drawing object range of an object of the 3D drawing process is moved in response to a scrolling operation. While the drawing object range is moved, 3D image data are successively produced using the drawing object range at every point of time and outputted to implement 3D display on a display screen. Thereupon, the drawing object range to be used for the 3D drawing is moved such that individual portions in the drawing object range are moved by movement amounts determined with reference to a distance in a perpendicular direction at a reference position in the drawing object range.

15 Claims, 5 Drawing Sheets

3D DISPLAY

DRAWING PROCESSING APPARATUS, DISPLAY APPARATUS, DRAWING PROCESSING METHOD AND NAVIGATION APPARATUS

CROSS REFERENCES TO RELATED APPLICATIONS

The present invention contains subject matter related to Japanese Patent Application JP 2005-067414 filed with the Japanese Patent Office on Mar. 10, 2005, the entire contents of which being incorporated herein by reference.

BACKGROUND OF THE INVENTION

This invention relates to a drawing processing apparatus and a drawing processing method wherein three-dimensional data is produced based on map data and also to a display apparatus which uses the drawing processing apparatus and the drawing processing method.

Apparatus and methods which pertain to the present invention are disclosed in Japanese Patent No. 3520703 (hereinafter referred to as Patent Document 1), Japanese Patent Laid-Open No. 2000-29382 (hereinafter referred to as Patent Document 2), Japanese Patent Laid-Open No. 2003-66944 (hereinafter referred to as Patent Document 3), and Japanese Patent Laid-Open No. Hei 9-229706 (hereinafter referred to as Patent Document 4).

To produce three-dimensional image data based on map data and display the three-dimensional image data as a 3D (three-dimensional) image on a display screen is implemented, for example, with a vehicle-carried or portable navigation apparatus or a like apparatus.

Particularly a navigation apparatus can switch a map display mode between a conventional two-dimensional (2D) display mode and a 3D display mode in response to an operation by a user or the like. As already known, in the 2D display mode, a map image is displayed in a planar form around the position of a self vehicle (vehicle in which the navigation apparatus itself is incorporated). On the other hand, in the 3D display mode, an image is displayed such that the user can look out over to a remote location as in a case of actual scenery toward an advancing direction (viewing or line-of-sight direction) from a location in the proximity of the position of the self vehicle.

SUMMARY OF THE INVENTION

Incidentally, while a map image is displayed as a 2D display image or a 3D display image based on map data on a navigation apparatus or a like apparatus, the map image is scrolled in response to a scrolling operation of the user.

Here, a drawing process and a scrolling operation in the 3D display mode are examined. In the 2D display mode, for example, map data within a predetermined range in the forward and backward directions and the leftward and rightward directions from the position of the self vehicle are used to produce map image data. However, in the 3D display mode, map data within a range which becomes wider toward a remote location in the viewing direction from the position of the self vehicle are used. In other words, as the distance in the viewing direction increases, the extent in a direction perpendicular to the viewing direction, that is, in the leftward and rightward directions, increases, and this range is used as a range of an object of drawing.

Then, if a scrolling operation is performed, then in the 2D display mode, display data may be produced and outputted while the range of an object of drawing processing on the map data is successively moved or shifted by a predetermined amount in the direction indicated by the scrolling operation.

Also in the 3D display mode, 3D image data may be successively produced from the drawing object range at the point of time during the course of the movement and displayed or outputted while the drawing object range on the map data is successively moved in response to the scrolling operation.

However, in the 3D display mode, the drawing object range on the map data is wide when compared with that in the 2D display mode and has a leftward and rightward extent which increases toward a remote location. From this, even if the drawing object range is moved simply in response to the scrolling operation, the display image is likely to provide a sense of incongruity in terms of the difference in the amount of scrolling movement per unit period of time and so forth. Further, the user is likely to have an unnatural operation feeling when compared with the scrolling operability which is in the case of the 2D display mode.

In the present invention, it is desirable to provide a drawing processing apparatus and method, a display apparatus and a navigation apparatus wherein, when a scrolling operation is performed in a 3D image display mode, image scrolling which does not provide a sense of incongruity to the user is achieved and a difference in operability from scrolling which particularly is in a 2D display mode is eliminated to enhance the operation feeling of the user.

In order to attain the desire described above, according to an embodiment of the present invention, including a drawing function configured to produce three-dimensional image data using, where a drawing object range on map data is defined as a range which includes a reference position and in which a distance in a perpendicular direction to a viewing direction from the reference position increases toward the viewing direction, the map data in the drawing object range, and a drawing object range moving function configured to move the drawing object range in a scrolling instruction direction in response to a scrolling instruction to scroll in the perpendicular direction and calculate movement amounts at individual portions in the drawing object range upon the movement of the drawing object range in response to values of the ratio in distance in the perpendicular direction at the individual portions with reference to the distance in the perpendicular direction at the reference position.

The reference position may be a position of the drawing processing apparatus itself on the map data detected by a position detection section.

According to another embodiment of the present invention, there is provided a display apparatus comprising a map data storage section configured to store map data therein, an operation section configured to issue a scrolling instruction, a drawing processing section including a drawing function configured to produce three-dimensional image data using, where a drawing object range on the map data acquired from the map data storage section is defined as a range which includes a reference position and in which a distance in a perpendicular direction to a viewing direction from the reference position increases toward the viewing direction, the map data in the drawing object range and a drawing object range moving function configured to move the drawing object range in a scrolling instruction direction in response to a scrolling instruction to scroll in the perpendicular direction by an operation of the operation section and calculate movement amounts at individual portions in the drawing object range upon the movement of the drawing object range in response to values of the ratio in distance in the perpendicular direction at the individual portions with reference to the distance in the perpendicular direction at the reference position, and a display section configured to display a three-dimensional image based on the three-dimensional image data produced by the drawing processing section.

The display apparatus may further include position detection section configured to detect a position of the display apparatus itself, the reference position being the position of the display apparatus itself on the map data detected by the position detection section.

According to a further embodiment of the present invention, there is provided a drawing processing method for producing three-dimensional image data using map data and outputting the three-dimensional image data, including a drawing step of producing three-dimensional image data using, where a drawing object range on map data is defined as a range which includes a reference position and in which a distance in a perpendicular direction to a viewing direction from the reference position increases toward the viewing direction, the map data in the drawing object range, and a drawing object range moving step of moving the drawing object range in a scrolling instruction direction in response to a scrolling instruction to scroll in the perpendicular direction and calculate movement amounts at individual portions in the drawing object range upon the movement of the drawing object range in response to values of the ratio in distance in the perpendicular direction at the individual portions with reference to the distance in the perpendicular direction at the reference position.

According to a further embodiment of the present invention, there is provided a navigation apparatus comprising a map data storage section configured to store map data therein, an operation section configured to issue a scrolling instruction, a drawing processing section including a drawing function configured to produce three-dimensional image data using, where a drawing object range on the map data acquired from the map data storage section is defined as a range which includes a reference position and in which a distance in a perpendicular direction to a viewing direction from the reference position increases toward the viewing direction, the map data in the drawing object range and a drawing object range moving function configured to move the drawing object range in a scrolling instruction direction in response to a scrolling instruction to scroll in the perpendicular direction by an operation of the operation section and calculate movement amounts at individual portions in the drawing object range upon the movement of the drawing object range in response to values of the ratio in distance in the perpendicular direction at the individual portions with reference to the distance in the perpendicular direction at the reference position, and a display section configured to display a three-dimensional image based on the three-dimensional image data produced by the drawing processing section.

In the drawing processing apparatus and method, display apparatus and navigation apparatus, the drawing processing apparatus or the drawing processing section uses the drawing function thereof to produce three-dimensional image data, that is, 3D image data, using information of a drawing object range to be extracted as a predetermined range on map data. Further, the drawing object range moving function moves the drawing object range of an object of a 3D drawing process in response to a scrolling operation. As the drawing function uses the drawing object range at every point of time to produce 3D image data and outputs the 3D image data while the drawing object range moving function successively moves the drawing object range, 3D display can be implemented on the display screen. At this time, the drawing object range moving function moves the drawing object range for use for the 3D drawing such that individual portions in the drawing object range are moved by movement amounts determined with reference to the distance in the perpendicular direction at the reference position within the drawing object range.

It is to be noted that the distance in the perpendicular direction is a distance within a range set as the drawing object range. The drawing object range for drawing of a 3D image is defined as a range in which the distance in the perpendicular direction to the viewing direction from the reference position increases toward the viewing direction. In particular, if the drawing object range is viewed in the forward and backward directions from a certain reference position, for example, the position of the drawing processing apparatus, display apparatus or navigation apparatus itself, then the drawing object range is expanded in the leftward and rightward directions (perpendicular direction) as the distance from the position of the drawing processing apparatus, display apparatus or navigation apparatus itself increases. Consequently, the drawing object range has a substantially sectoral shape. Therefore, the distance of the portions in the perpendicular direction increases as the distance from the reference position increases. Since, when such a drawing object range as just described is moved upon scrolling, the movement amounts at the individual portions in the drawing object range are set to movement amounts calculated in response to the values of the ratio in distance in the perpendicular direction at the individual portions with reference to the distance in the perpendicular direction at the reference position, movement of the drawing object range which provides no sense of incongruity to the user as viewed from the reference position, that is, a scroll image which provides no sense of incongruity to the user, can be obtained.

It is to be noted that the reference position is a position which is the eye point of the user on the 3D image and is, for example, a self position. The self position signifies the position of the pertaining apparatus itself such as the position of a vehicle where the drawing processing apparatus, display apparatus or navigation apparatus is of the vehicle-carried type or the position of the user who owns the pertaining apparatus where the drawing processing apparatus, display apparatus or navigation apparatus is of the portable type. For example, where the present invention is implemented as a navigation apparatus, the self position is a position indicated as a self vehicle position on the map image.

The reference position may not necessarily be a self position. For example, in such a case that an arbitrary point on the map is designated so that a 3D image as viewed from the point is displayed, the reference position is given as a certain point on the map designated arbitrarily.

In summary, with the drawing processing apparatus and method, display apparatus and navigation apparatus, scrolling on a screen in 3D display can be implemented without providing a sense of incongruity to the user.

Further, where the reference position described above is set to the self position, a sense of incongruity in a scrolling operation from that upon scrolling in the 2D display mode can be eliminated. Particularly in an apparatus wherein the display mode can be changed over between the 2D display mode and the 3D display mode, a scrolling operation which provides an appropriate operation feeling to the user can be provided.

Further, where the self position is set as the reference position, also an advantage that the scrolling amount can be determined without being influenced by the lift angle in the 3D display mode can be achieved.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, a preferred embodiment of the present invention is described wherein the present invention is carried out as a vehicle-carried navigation apparatus.

Figure 1:
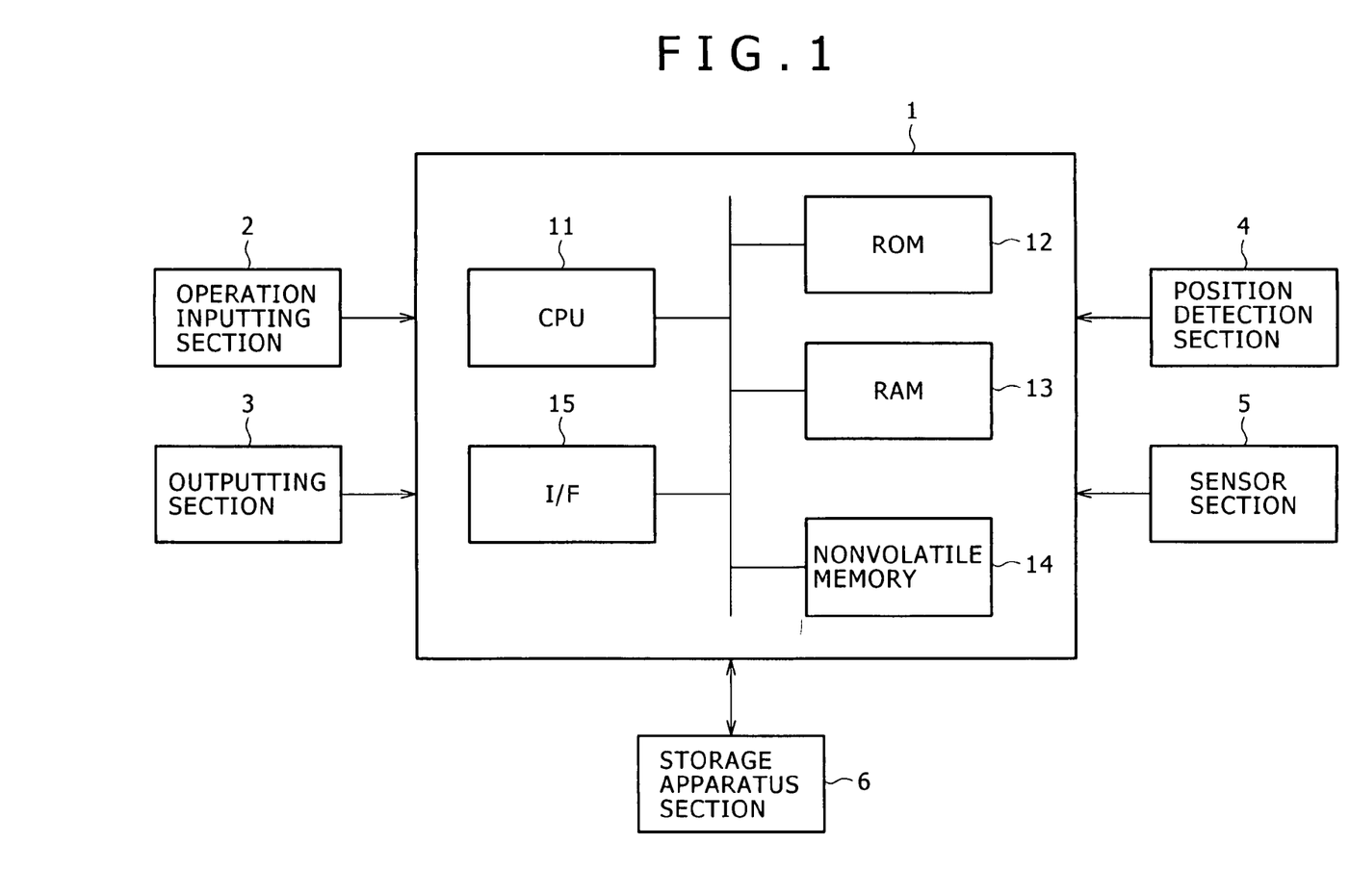
FIG. 1 is a block diagram showing a configuration of a navigation apparatus to which the present invention is applied.

FIG. 1 shows a hardware configuration of the navigation apparatus. The navigation apparatus includes an arithmetic operation processing section 1, an operation inputting section 2, an outputting section 3, a position detection section 4, a sensor section 5, and a storage apparatus section 6. The components of the navigation apparatus may be provided integrally or may otherwise be formed as apparatus sections accommodated in different housings from each other and connected to each other for wired or wireless communication therebetween. Naturally, some of the components may be formed integrally while the other component or components are formed as separate apparatus.

The operation inputting section 2 is an apparatus section which receives an operation of the user and transmits information of the operation to the arithmetic operation processing section 1. The operation inputting section 2 is implemented, for example, as an operation element or elements provided on a panel of a body housing including the arithmetic operation processing section 1 such as various keys, a jog dial or a stick or implemented as a remote commander provided separately from the body housing. Where the operation inputting section 2 is formed as a remote commander, operation information of an operation element or elements such as keys or a dial provided on the remote commander is transmitted to the arithmetic operation processing section 1 by infrared rays or radio waves. Or, the remote commander is connected by a wire to the housing which has the arithmetic operation processing section 1 such that the operation information is transmitted to the arithmetic operation processing section 1.

The operation inputting section 2 may be formed as a touch panel on a display screen. In this instance, the operation inputting section 2 is provided integrally with a display section of the outputting section 3. Further, the operation inputting section 2 may be configured in such a form that a menu screen or an icon displayed on the display section is clicked by means of a mouse or a predetermined pointing device.

Further, the operation inputting section 2 may include a microphone so that sound can be inputted or may include a camera section so that an image can be inputted. In those instances, the operation inputting section 2 may include a sound recognition apparatus or an image recognition apparatus so that sound or an image inputted can be supplied as operation information to the arithmetic operation processing section 1. Or, a sound recognition apparatus or an image recognition apparatus may be provided on the arithmetic operation processing section 1 side so that sound or an image inputted can be recognized as operation information or as various kinds of input information by the arithmetic operation processing section 1 side.

The outputting section 3 is an apparatus section which transmits output data outputted as a result of arithmetic operation by the arithmetic operation processing section 1 to the user and may be a display unit (display section) which is an image outputting apparatus or a speaker or the like which is a sound outputting apparatus.

The position detection section 4 is an apparatus section which detects the position of the navigation apparatus, that is, the position of an automobile in which the navigation apparatus is incorporated, and is, for example, a GPS positioning apparatus which makes use of the GPS (Global Positioning System). As already known, the GPS positioning system receives radio waves sent from a plurality of GPS satellites to calculate the position from the stationary satellites to determine the latitude and the longitude as the position of the self vehicle on a map.

The position detection section 4 supplies information of the latitude and the longitude as the measured position of the self vehicle to the arithmetic operation processing section 1.

The sensor section 5 is an apparatus section which detects a running situation, a behavior and so forth of the vehicle. The sensor section 5 may include, for example, a vehicle speed sensor for detecting the number of rotations of a wheel, a vibration gyro sensor for detecting the angular speed of rotation of the vehicle body, an acceleration sensor for detecting the acceleration of the vehicle, and a vibration sensor for detecting vibrations of the vehicle. The sensor section 5 may further include apparatus for detecting the state of a driving operation apparatus of the vehicle, for example, a parking brake switch, a brake lamp switch, a steering angle sensor and a throttle opening sensor.

Such detection information from the sensor section 5 is supplied to the arithmetic operation processing section 1. The arithmetic operation processing section 1 uses both of the detection information from the sensor section 5 and the position information from the position detection section 4 so that it can execute self vehicle position detection with a higher degree of accuracy.

The storage apparatus section 6 is a storage device for storing a large amount of data including map data, POI (Point of Interest) information, search information, music/image content data and so forth. For example, the storage apparatus section 6 may be a disk drive apparatus which uses an optical disk such as a CD-ROM or a DVD-ROM as a recording medium or a recording and reproduction apparatus for a magnetic recording medium such as a hard disk drive. Further, the storage apparatus section 6 may be a card reader/writer which uses a memory card in which a solid-state memory is built as a recording medium.

The storage apparatus section 6 may be provided integrally with the body housing for the arithmetic operation processing section 1 or may be formed as a separate apparatus and connected for communication by radio communication or by wire communication to the arithmetic operation processing section 1. The storage apparatus section 6 is an example of a map data storage section.

The arithmetic operation processing section 1 is an apparatus section which performs an arithmetic operation process necessary for the navigation apparatus and includes, for example, a CPU 11, a ROM 12, a RAM 13, a nonvolatile memory 14 and an interface section 15. The arithmetic operation processing section 1 is an example of a drawing processing apparatus or a drawing processing section.

The ROM 12 has stored therein operation programs, and constants and fixed information for use for various processes. It is to be noted that the operation programs may otherwise be stored in a storage medium of the storage apparatus section 6 such that, when any of them is to be used, it is loaded into the arithmetic operation processing section.

The RAM 13 is used as a working area or a loading area for a program or used for temporary storage of information.

The nonvolatile memory 14 is a reloadable memory capable of retaining stored data also when power supply to the system is interrupted, and may be an SRAM, a flash memory or the like which is backed up, for example, by a battery. The nonvolatile memory 14 stores coefficients for use for various processes, information registered by the user, route information of a designated route, past traveling history information and so forth.

The CPU 11 performs information processing and control processing necessary for the navigation apparatus based on the programs stored in the RAM 13. For the information processing or the control processing, the CPU 11 uses the RAM 13 as a working area and refers to information stored in the ROM 12 and/or the nonvolatile memory 14.

The interface section 15 performs inputting and outputting between the arithmetic operation processing section 1 and the other components, that is, the operation inputting section 2, outputting section 3, position detection section 4, sensor section 5 and storage apparatus section 6. The interface section 15 receives operation information and various kinds of input information from the operation inputting section 2, position information from the position detection section 4 and detection information from the sensor section 5 as inputs thereto and transmits the received information to the CPU 11. Further, the interface section 15 supplies control information, image data and sound data outputted from the CPU 11 to the outputting section 3 so that the outputting section 3 may execute image outputting and sound outputting necessary for the navigation apparatus. Furthermore, the interface section 15 transmits an access request from the CPU 11 to the storage apparatus section 6 so that the storage apparatus section 6 executes required data reproduction and further executes, under certain circumstances, data recording. Further, the interface section 15 fetches map data and so forth read out from the storage apparatus section 6 into the arithmetic operation processing section 1.

Figure 2:
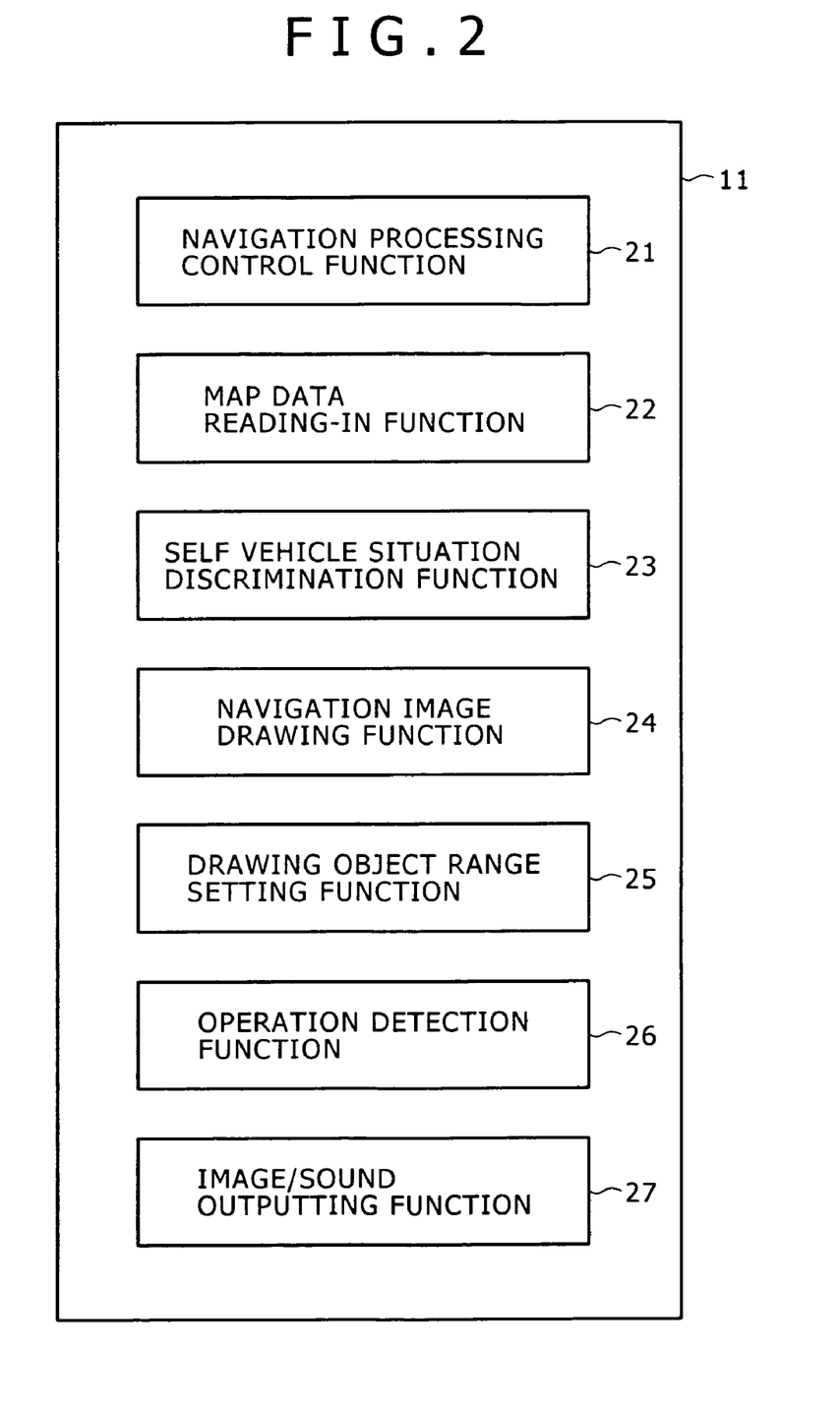
FIG. 2 is a block diagram illustrating functions of a CPU of the navigation apparatus of FIG. 1.

FIG. 2 illustrates functions which the CPU 11 has, that is, functions implemented by the arithmetic operation process based on the programs stored in the ROM 12 and so forth.

The CPU 11 includes a navigation processing control function 21, a map data reading-in function 22, a self vehicle situation discrimination function 23, a navigation image drawing function 24, a drawing object range setting function 25, an operation detection function 26 and an image/sound outputting function 27 provided as functions thereof. The functions may each be implemented by an individual program module, or programs for executing a plurality of ones of the functions may be included in a mixed state in one program.

The navigation processing control function 21 is a function for controlling processing operations necessary for the navigation apparatus and performs instruction and timing control of processes of the other functions so that they perform systematic navigation operation. Further, the navigation processing control function 21 performs processes for registration of a destination or a transit spot of the user, route search and so forth, guide display together with advancement of the self vehicle and output control of guide sound and so forth.

The map data reading-in function 22 issues an accessing instruction to the storage apparatus section 6 and performs reading-in of map data from the storage apparatus section 6 in accordance with an instruction of the navigation processing control function 21. For example, the map data reading-in function 22 reads in map information for a required range from the storage apparatus section 6 into the RAM 13, for example, in response to the position of the self vehicle, a position designated by the user, route information designated by the user and like information.

It is to be noted that the map data reading-in function 22 performs also reading-in of various data stored in the storage apparatus section 6 other than such map data as mentioned above. Further, if the storage apparatus section 6 is an apparatus section into which data can be written, then the map data reading-in function 22 performs also data writing control into the storage apparatus section 6.

The self vehicle situation discrimination function 23 discriminates the position or a behavior of the self vehicle based on position information from the position detection section 4 and detection information from the sensor section 5.

The navigation image drawing function 24 produces map image data to be displayed on the display section of the outputting section 3 in response to map information read in by the map data reading-in function 22, the self vehicle position discriminated by the self vehicle situation discrimination function 23, a user operation, registration information of the user, a POI and so forth. The map information can be drawn as a 2D display image and a 3D display image. Further, the navigation image drawing function 24 produces various image data to be displayed on the display section of the outputting section 3 such as a menu image, an icon image, various image pictures and various guide images in accordance with an instruction of the navigation processing control function 21.

The drawing object range setting function 25 sets a drawing object range on map data to be used when the navigation image drawing function 24 produces map image data for a 2D display image or a 3D display image. The drawing object range is a range of map data to be represented as an image, and is moved or shifted, when a map image centered at the self vehicle position is displayed, in accordance with the advancement of the self vehicle position discriminated by the self vehicle situation discrimination function 23. Further, if a scrolling operation is performed as hereinafter described, the drawing object range setting function 25 moves the drawing object region in response to the operation. Since the navigation image drawing function 24 successively produces image data using map information in the drawing object range, that the drawing object range is moved by the drawing object range setting function 25 signifies that the map image on the display section varies.

The operation detection function 26 detects operation information and various input information from the operation inputting section 2 and sends the inputted information to the navigation processing control function 21. The navigation processing control function 21 controls the other functions based on operation information and so forth detected by the operation detection function 26 to execute necessary operations.

The image/sound outputting function 27 outputs image data or sound data to be presented from the outputting section 3 to the user in accordance with an instruction of the navigation processing control function 21. The image data to be outputted include a map image, a menu image, various guide images and so forth produced by the navigation image drawing function 24.

Now, an image data production process for the 2D display and the 3D display of a map image executed by the navigation apparatus of the present embodiment having such a configuration as described above is described. Particularly, the image data production process allows an operation for scrolling map information through the operation inputting section 2, and a process upon such a scrolling operation as just mentioned is described for the two cases of the 2D display and the 3D display.

In particular, a drawing object range of map data in the 2D display mode is described with reference to FIG. 3, and a drawing object range of map data in the 3D display mode is described with reference to FIGS. 4A and 4B.

Figure 3:
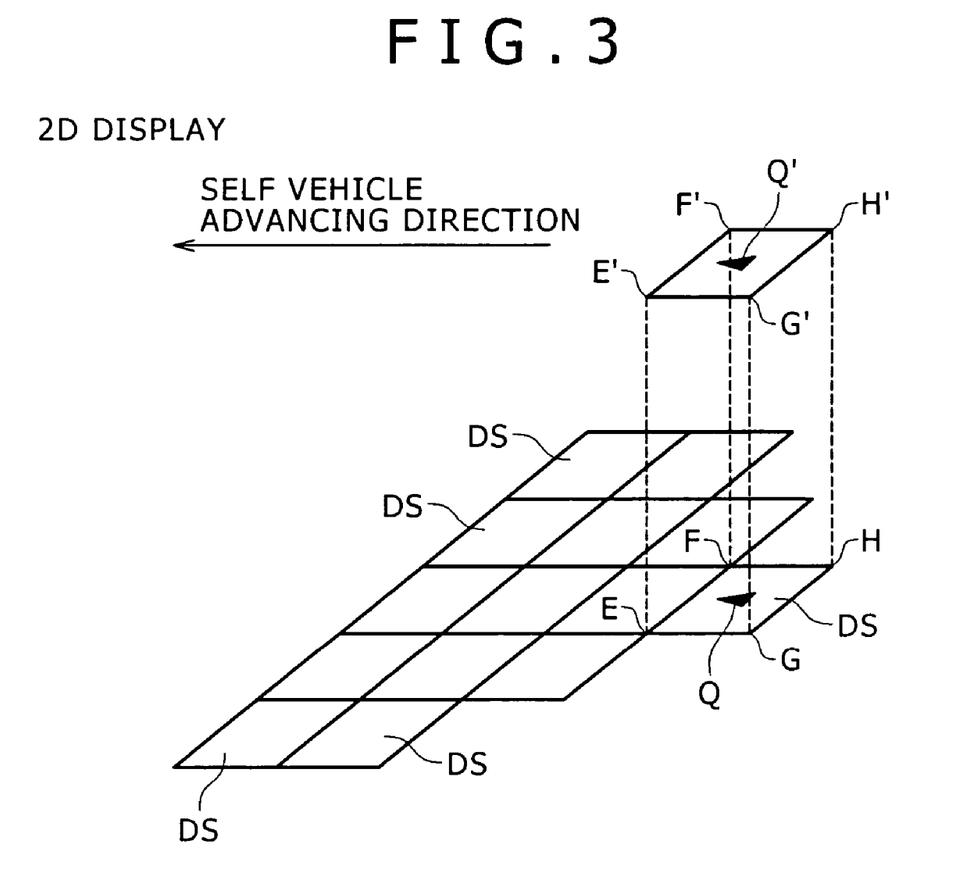
FIG. 3 is a schematic view illustrating a 2D display mode of the navigation apparatus of FIG. 1.

Referring first to FIG. 3 which shows a drawing object range in the 2D mode, reference character DS denotes a data cell which forms map data. A position Q represents the position of the self vehicle on the map data, and the self vehicle position Q is within a data cell DS indicated by E, F, G and H.

In this instance, a range actually displayed on the display section of the outputting section 3 is indicated by a rectangle E'F'G'H' shown above the data cell DS. A position Q' is the self vehicle position on the display screen.

In other words, FIG. 3 illustrates that, when a 2D map image centered at the self vehicle position Q is to be displayed, the drawing object range setting function 25 sets the map data within the range E, F, G, H including the self vehicle position Q as a drawing object range and the navigation image drawing function 24 produces map image data in such a manner that the drawing object range E, F, G, H is mapped to the display range E', F', G', H'.

While, in FIG. 3, the advancing direction of the self vehicle is the leftward direction, as the self vehicle advances, the drawing object range setting function 25 successively shifts the drawing object range E, F, G, H on the map data to the left side in FIG. 3. Since the navigation image drawing function 24 successively produces a map image from the map data in the drawing object range, the range of the map displayed as the self vehicle advances changes successively.

The drawing object range setting function 25 moves the drawing object range not only in response to the advancement of the self vehicle but also in response to detection of a scrolling operation on the operation inputting section 2 by the operation inputting section 2.

In this instance, if the drawing object range display is moved by Δ meters per unit period of time in response to the scrolling operation, then the map data at a location to which the drawing object range E, F, G, H is moved on the map data may be mapped to the display range E', F', G', H'. This similarly applies whichever direction the scrolling direction is.

In particular, the drawing object range E, F, G, H is assumed to represent a data cell for displaying the display range E', F', G', H' to be displayed on the display screen, and the number of dots on the E'-F' side of the display screen is represented by α.

Here, if it is assumed that the display screen displays a map for L meters in the transverse direction indicated as the E'-F' side of the display screen, that is, in the direction perpendicular to the advancing direction of the self vehicle, then the length in the transverse direction on the display screen is L meters at any portion. In short, distance on the E'-F' side=L [meters], distance on the G'-H' side=L [meters], and distance in the transverse direction at the point of the self vehicle display position Q'=L [meters].

Therefore, the position to be used as a reference when a scrolling operation is performed in the transverse direction (perpendicular direction to the advancing direction) exhibits no difference among the positions of E-F, G-H and Q on the map data.

Therefore, if the drawing object range is scrolled by Δ meters in a unit period of time in the transverse direction, then $$\Delta/L \times L = \Delta \text{ (meters)}$$

is satisfied at all positions, and therefore, a data cell after the drawing object range is shifted simply by Δ meters in the transverse direction should be drawn.

The distance per unit dot is $$L/\alpha \text{ [meter/dot]}$$

at all portions, and if the drawing object range is scrolled transversely by a distance corresponding to β dots in a unit period of time, then scrolling should be performed by $$\beta \times L/\alpha = \beta L/\alpha \text{ [meters]}$$

Now, a drawing object range of map data in the 3D display mode is described with reference to FIGS. 4A and 4B.

Figure 4A:
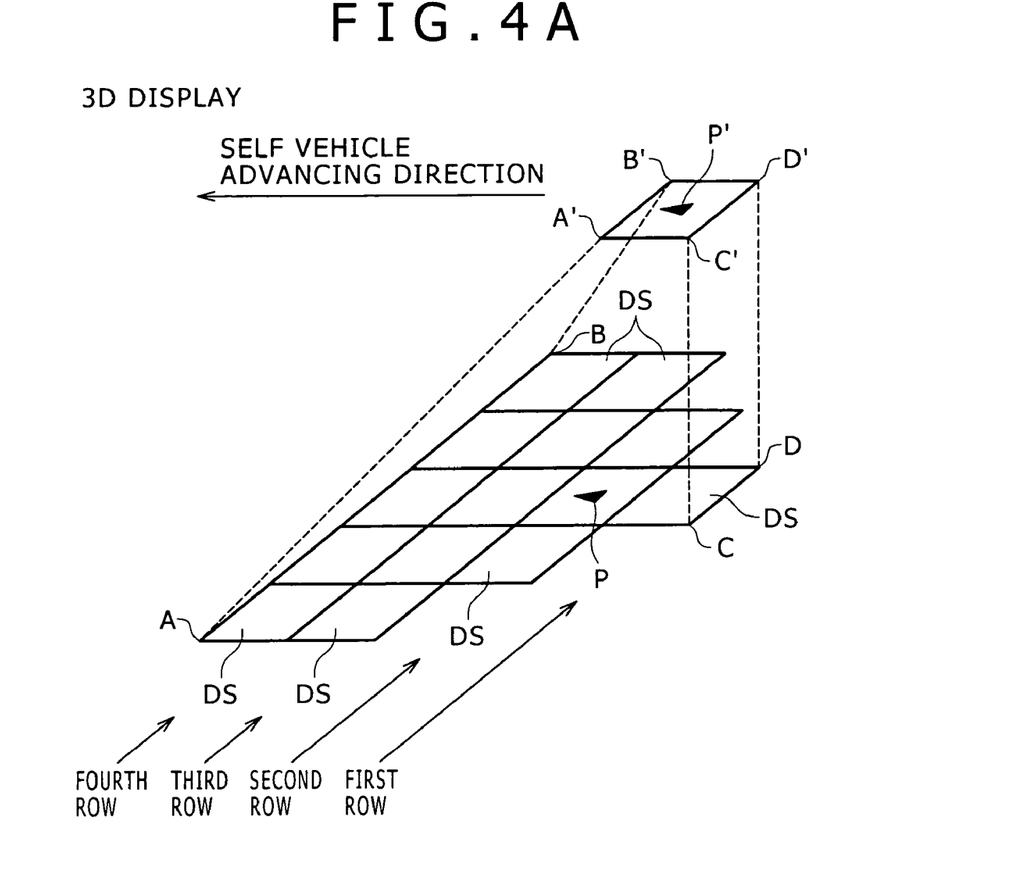
FIGS. 4A and 4B are schematic views illustrating a 3D display mode of the navigation apparatus of FIG. 1.

Referring first to FIG. 4A, reference character DS denotes a data cell similarly as in FIG. 3. Further, a position P is the self vehicle position on map data.

In this instance, a range actually displayed on the display section of the outputting section 3 is indicated by a rectangle A', B', C', D' shown above the data cells DS. A position P' is the self vehicle position on the display screen.

In the 3D display mode, the drawing object range setting function 25 sets the map data within the range A, B, C, D including the self vehicle position P as a drawing object range and the navigation image drawing function 24 produces map image data in the display range A', B', C', D' from the map data in the drawing object range A, B, C, D.

In particular, in the 3D display mode, the drawing object range A, B, C, D includes the self vehicle position P as a reference position and increases the distance in a perpendicular direction to a viewing direction (=self vehicle advancing direction which is an upward leftward direction in FIG. 4A) from the self vehicle position P as the vehicle advances in the viewing direction.

In the case of the present example, the drawing object range A, B, C, D includes data cells DS from the first to fourth rows shown in FIG. 4A, and the first row includes one data cell; the second row includes three data cells; and the third and fourth rows include five data cells.

In the example of the 3D display described above, the C'-D' side and the A'-B' side have distances different from each other, and the latter distance is five times equal to the former distance.

Therefore, if the movement by Δ meters in the 2D display mode is performed with reference to the A'-B' side or the C'-D' side, then this may provide a sense of incongruity to the user.

Thus, attention is paid to the self vehicle position P gazed at by the user and the self vehicle display position P'. In an actual area on the map data in which the self vehicle position P is, in the case of the present example, an amount of data equal to three times that on the C-D side is involved. If the amount of movement per unit period of time is set to Δ meters with reference to the portion just described, then a sense of incongruity with regard to the scrolling speed in the 2D display and the 3D display is eliminated.

Further, in the 2D display mode, a speed at which the full screen should be changed by scrolling in a unit period of time is sometimes demanded to the user. For example, in the case of transverse scrolling, scrolling by which the F-H side in FIG. 3 comes to the position of the E-G side corresponds to such scrolling as just described. In this instance, if the scrolling is performed such that the point D merely moves to the point C or the point B moves to the point A in FIGS. 4A and 4B, then the user may feel that the scrolling amount is excessively small (that the scrolling is slow) or that the scrolling amount is excessively great (that the scrolling is excessively fast). Therefore, also in this instance, if the scrolling speed is selected such that it is equal to the speed at which the area in which the self vehicle position P exists moves fully by one block distance, then a sense of incongruity is eliminated.

More particular description is given below.

It is assumed that A', B', C', D' are the display range, and A, B, C and D are a range of data cells for displaying the display range A', B', C', D', that is, a drawing object range.

Further, the number of dots on the A'-B' side of the display screen is represented by $\alpha$.

Figure 4B:
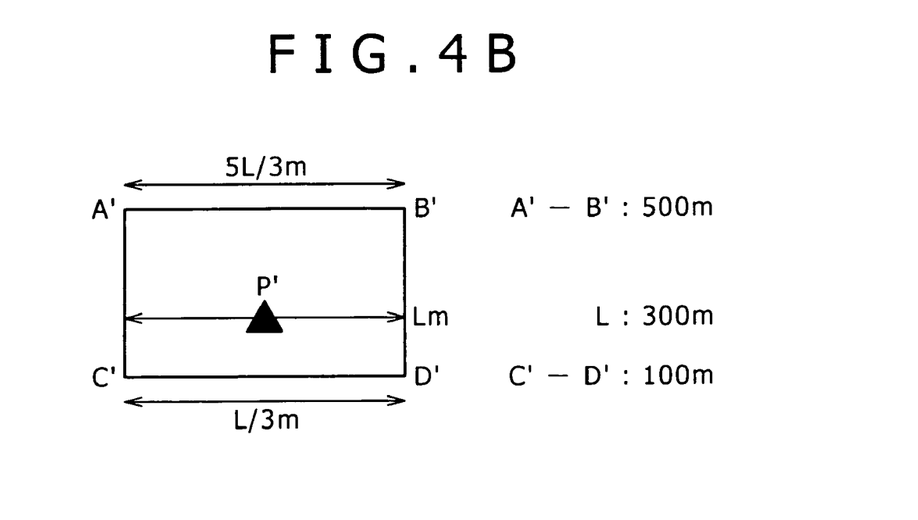

If it is assumed that the actual position P on the map data of the displayed self vehicle position P' is set as a reference and the length at the self vehicle position P in the transverse direction (perpendicular direction to the self vehicle advancing direction) displays for L meters, then the length at the self vehicle position P in the transverse direction on the display screen is represented by distance on the $A'$-$B'$ side=$(5/3) \times L = 5L/3$ [meters]

distance in the transverse direction at the self vehicle position P=L[meters]

distance on the $C'$-$D'$ side=$(1/3) \times L = L/3$ [meters]

as seen also from FIG. 4B.

For example, if L=300 meters, then
distance on the A'-B' side=500 meters,
distance on the C'-D' side=100 meters.
They correspond, as distances per unit display dot, to $A'$-$B'$ side=$(5L/3)/\alpha = 5L/3\alpha$ [meters]

transverse direction at the self vehicle position $P = L/\alpha$ [meter/dot], $C'$-$D'$ side=$(L/3)/\alpha = L/3\alpha$ [meter/dot]

Here, if the scrolling is performed by $\Delta$ meters in a unit period of time in the transverse direction, then the drawing object range should be scrolled, on the $A'$-$B'$ side, by $(\Delta/L) \times (5L/3) = 5\Delta/3$ [meters], at the position $P$, by $(\Delta/L) \times L = \Delta$ [meters] and on the $C'$-$D'$ side, by $(\Delta/L) \times (L/3) = \Delta/3$ [meters].

Similarly, if the scrolling is performed by a $\beta$-dot distance in a unit period of time in the transverse direction, then the drawing object range should be scrolled, on the $A'$-$B'$ side, by $\beta \times (5L/3\alpha) = 5\beta L/3\alpha$ [meters], at the position $P$, by $(\beta \times L/\alpha) = \beta L/\alpha$ [meters]

and on the $C'$-$D'$ side, by $\beta \times L/3\alpha = \beta L/3\alpha$ [meters].

Particular numerical values are applied. For example, if it is assumed that the scrolling is performed by 10 meters in a unit period of time, then a region shifted by on the $A'$-$B'$ side, by $5 \times 10/3 = 50/3 = 17$ meters, at the position P, 10 meters and
on the C'-D' side, by 10/3=3 meters should be drawn.

This can be represented in the following manner.

If
the number of displayed data cells on the A-B side=ABcell (in the example shown, 5 cells)
the number of displayed data cells at the position P=Pcell (in the example shown, 3 cells)
the number of displayed data cells on the C-D side=CDcell (in the example shown, 1 cell)
the display distance in the horizontal direction at the position P=L, then the lengths displayed are given respectively as $A'$-$B'$ side=$(ABcell \times L)/Pcell$, P position=L, $C'$-$D'$ side=$(CDcell \times L)/Pcell$.

Then, where the scrolling should be performed by the length $\Delta$, then a portion scrolled by $A'$-$B'$ side: $\Delta/((ABcell \times L)/Pcell) = (\Delta \times Pcell)/(L \times ABcell)$ P position: $\Delta/L$ $C'$-$D'$ side: $\Delta/((CDcell \times L)/Pcell) = (\Delta \times Pcell)/(L \times CDcell)$ should be drawn.

The foregoing is summarized.

When scrolling is to be performed in the 2D display mode, since an equal scale is used for display at all locations of the screen, the scrolling may be performed whichever position is used particularly as a reference for the scrolling amount.

On the other hand, in the 3D display mode, the ratio with respect to actual map data is different among an upper portion, a lower portion and a middle portion of the screen, and therefore, it is necessary to decide a reference for the scrolling amount.

At this time, for example, if the scrolling is performed by $\Delta$ meters with reference to an upper portion of the screen, then since this corresponds to a mere fraction at a lower portion screen, it generally looks that the screen scrolls little. On the contrary, if a lower portion of the screen is set as a reference, then since the magnitude at an upper portion of the screen corresponds to several times that at the lower portion, it looks that the screen scrolls by a great amount.

Therefore, if the self vehicle position P is set as an optimum reference position and the scrolling amounts at an upper portion and a lower portion of the screen are selected with respect to that at the self vehicle position P, then scrolling wherein the user does not feel a sense of incongruity can be achieved when compared with that in the case of the 2D display.

In short, in the case of the 3D display mode, the drawing object range setting function 25 sets the amounts of movement of individual portions in the drawing object range to amounts of movement calculated in accordance with the values of the ratio in distance in the perpendicular direction at individual portions with reference to the distance L (distance on the side in the transverse direction) in the perpendicular direction at the self vehicle position P.

Thus, upon scrolling by $\Delta$, the amounts of movement of the drawing object range can be calculated by simple expressions as amount of movement of the $A$-$B$ side=$(\Delta \times Pcell)/(L \times ABcell)$ amount of movement of the $P$ position=$\Delta/L$ amount of movement of the *C-D* side=(Δ×*P*cell)/(*L*× *CD*cell)

Further, since ABcell, Pcell and CDcell are determined uniquely by the lift angle upon display and L is determined uniquely by the display scale, the calculation expressions for the scrolling amount are effective also where the lift angle or the scale is different. In other words, the foregoing can be implemented without being influenced by the display lift angle or scale.

Figure 5:
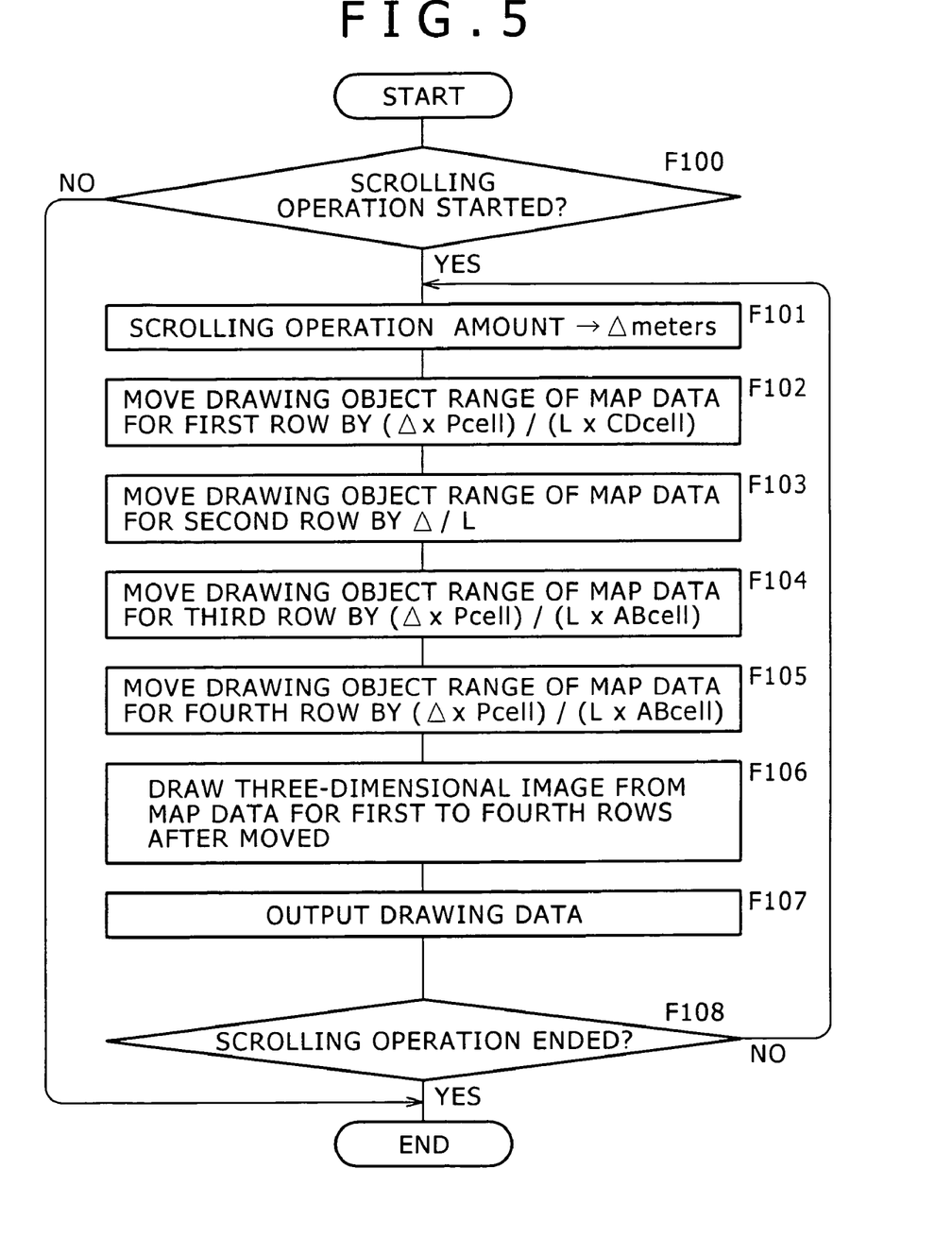
FIG. 5 is a flow chart illustrating a procedure for 3D display of the navigation apparatus of FIG. 1.

An example of a processing procedure of the CPU 11 for the scrolling is illustrated in FIG. 5. The processing procedure is an example applied where the drawing object range in the 3D display mode is set in such a manner as illustrated in FIG. 4.

If it is detected by the navigation processing control function 21 that a scrolling operation of the user is started, then the processing of FIG. 5 advances from step F100 to step F101. At step F101, the drawing object range setting function 25 sets the scrolling operation amount in a unit period of time to Δ meters. It is to be noted that the scrolling operation element of the operation inputting section 2 is an operation element which can vary the scrolling amount with an operation amount thereof such as, for example, a joystick, then the scrolling operation amount is set to Δ meters in response to the operation amount of the operation element. On the other hand, if the scrolling operation element is an operation element by which a fixed scrolling speed is normally fixed, then the scrolling operation amount of Δ meters may be a fixed value.

At step F102, the drawing object range setting function 25 moves the map data corresponding to the data cell in the first row of FIG. 4 by the movement amount (Δ×Pcell)/(L×CDcell) in the scrolling operation direction. Then at step F103, the drawing object range setting function 25 moves the map data corresponding to the data cells DS in the second row of FIG. 4 by the movement amount Δ/L in the scrolling operation direction. Further at steps F104 and F105, the drawing object range setting function 25 moves the map data corresponding to the data cells DS in the third and fourth rows in FIG. 4 by the movement amount (Δ×Pcell)/(L×ABDcell) in the scrolling operation direction, respectively.

Since movement of the drawing object range in a unit period of time is performed by the processes at steps F101 to F105, the navigation image drawing function 24 uses the map data of the moved drawing object range to produce 3D image data at step F106.

Then at step F107, the image/sound outputting function 27 supplies the 3D image data produced by the navigation image drawing function 24 through the interface section 15 to the display section of the outputting section 3 so that the 3D image data may be displayed on the display section.

Then at step F108, the processes described above are repeated until after the navigation processing control function 21 detects that the scrolling operation comes to an end, the 3D map image is successively scrolled in the scrolling operation direction on the display section of the outputting section 3 without providing a sense of incongruity to the user.

In the embodiment described above, scrolling on a screen in the 3D display mode can be implemented without providing a sense of incongruity to the user, and by determining the movement amount positions at different portions in a drawing object range with reference to the position of the self vehicle, a sense of incongruity in the scrolling operation from that upon scrolling in the 2D display can be eliminated. Accordingly, particularly in a navigation apparatus wherein the display mode can be changed over between the 2D display mode and the 3D display mode as in the case of the navigation apparatus of the present embodiment, a scrolling operation which provides an appropriate operation feeling to the user can be provided.

Further, since the self vehicle position is set as a reference position, an advantage that the scrolling amount can be determined without being influenced by the lift angle in the 3D display mode can be anticipated.

It is to be noted that, while, in the foregoing description, a process in accordance with a scrolling operation when a map image as a 2D display image or a 3D display image is displayed with reference to the self vehicle position is performed with reference to the self vehicle position, according to a navigation apparatus, for example, it is possible for the user to designate an arbitrary point so that a map image around the designated point is displayed. If a scrolling operation is performed while 3D display is performed with reference to such a designated point as just mentioned, then movement of the drawing object range should be performed with reference to the designated point. In other words, the reference position to which the self vehicle position P is set in the foregoing description should be replaced by the designated position to perform movement of individual portions of the drawing object range. The direction corresponding to the advancing direction of the self vehicle becomes the viewing direction from the reference position with reference to which the 3D display is performed currently.

Further, while the foregoing description of the preferred embodiment relates to a vehicle-carried navigation apparatus, the present invention can be applied similarly, for example, to a portable navigation apparatus as well.

Furthermore, the present invention can be applied also to a map display apparatus which is not a navigation apparatus. For example, the present invention can be applied suitably to a scrolling process where a 3D map image is displayed on a display unit of a personal computer system by map displaying software installed in the personal computer. In those instances, the reference position which corresponds to the self vehicle position may be set to a position on the map data designated by the user, and the direction which corresponds to the self vehicle advancing direction may be set to the viewing direction in which a 3D image is drawn.

While a preferred embodiment of the present invention has been described using specific terms, such description is for illustrative purpose only, and it is to be understood that changes and variations may be made without departing from the spirit or scope of the following claims.

What is claimed is:

1. A drawing processing apparatus, comprising:
   a physical communication interface configured to receive a scrolling instruction; and
   a drawing processor that includes
   a drawing unit configured to produce a three-dimensional image of a drawing object range on a map, the unit configured to calculate a reference position and a distance in a perpendicular direction to a viewing direction from the reference position, the drawing unit configured to move the reference position with regard to the viewing direction, the drawing unit configured to produce the image using a ratio for an upper, middle, and lower portion of a display unit, the ratio being a number of display cells at a corresponding portion to a reference number of display cells, and
   a drawing object range moving unit configured to move the drawing object range in the scrolling instruction direction in response to the instruction from the physical communication interface to scroll in a perpendicular direction and to calculate individual movement amounts of an upper, middle, and lower portions of the drawing object range upon the movement of the drawing object range based on values of the ratio for each of the upper and lower portions, with reference to the distance in the perpendicular direction at the reference position.

2. The drawing processing apparatus according to claim 1, wherein the reference position is a position of the drawing processing apparatus itself on the map data detected by a position detection section.

3. The drawing processing apparatus according to claim 1, wherein the drawing unit is configured to set the ratio for the object range of each of the upper, middle, and lower portion of the display in a two-dimensional map to:

$$\beta \times L/\alpha = \beta L/\alpha,$$

wherein "$\beta$" is a distance the drawing object range is scrolled transversely in a unit period of time,
wherein "L" is a distance in the transverse direction of the reference position at a middle portion of the display, and
"$\alpha$" is a number of dots on an upper portion of the display.

4. The drawing processing apparatus according to claim 1, wherein the drawing unit is configured to set the ratio for the object range of the upper portion of the display to:

$$A'\text{-}B' \text{ side} = (ABcell \times L)/Pcell$$

wherein the "ABcell" is a number of data cells on the upper portion of the display,
"L" is a distance in the transverse direction at the middle portion, and
"Pcell" is a number of displayed data cells at the middle portion.

5. The drawing processing apparatus according to claim 1, wherein the drawing unit is configured to set a ratio for the object range of the middle portion of the display to:
P position=L
wherein "P" is the reference position of a self vehicle display position, and
"L" is a distance in the transverse direction of the middle portion.

6. The drawing processing apparatus according to claim 1, wherein the drawing unit is configured to set the ratio for the object range of the lower portion of the display to:

$$C'\text{-}D' \text{ side} = (CDcell \times L)/Pcell$$

wherein the "CDcell" is a number of data cells on the lower portion of the display,
"L" is a distance in the transverse direction of the middle portion, and
"Pcell" is a number of displayed data cells at the middle portion.

7. The drawing processing apparatus according to claim 1, wherein the individual scrolling ratio for the upper portion of the drawing object range is defined as:

$$A'\text{-}B' \text{ side}: \Delta/((ABcell \times L)/Pcell) = (\Delta \times Pcell)/(L \times ABcell)$$

wherein "$\Delta$" is a change in the scrolling length,
"ABcell" is a number of data cells on the upper portion of the display,
"L" is a distance in the transverse direction of the middle portion, and
"Pcell" is a number of displayed data cells at the middle portion.

8. The drawing processing apparatus according to claim 1, wherein the individual scrolling ratio for the middle portion of the drawing object range is defined as:
P position: $\Delta/L$ wherein "$\Delta$" is a change in the scrolling length, and
"L" is a distance in the transverse direction of the middle portion.

9. The drawing processing apparatus according to claim 1, wherein the individual scrolling ratio for the lower portion of the drawing object range is defined as:

$$C'\text{-}D' \text{ side}: \Delta/((CDcell \times L)/Pcell) = (\Delta \times Pcell)/(L \times CDcell)$$

wherein "$\Delta$" is a change in the scrolling length,
the "CDcell" is a number of data cells on the lower portion of the display,
"L" is a distance in the transverse direction of the middle portion, and
"Pcell" is a number of displayed data cells at the middle portion.

10. The drawing processing apparatus according to claim 1, wherein a scrolling speed of the upper and lower portions of a display are calculated based on values of the ratio for each of the upper and lower portions, such that the upper and lower portions move equal to the speed at which the reference moves.

11. A display apparatus, comprising:
a map data storage section configured to store map data therein;
an operation section configured to issue a scrolling instruction;
a drawing processing section including a drawing unit configured to produce a three-dimensional image of a drawing object range on a map acquired from the map data storage section the unit calculating a reference position and a distance in a perpendicular direction to a viewing direction from the reference position, the drawing unit configured to move the reference position with regard to the viewing direction, the drawing unit configured to produce the image using a ratio for an upper, middle, and lower portion of a display, the ratio being a number of display cells at a corresponding portion to a reference number of display cells;
a drawing object range moving unit configured to move the drawing object range in a scrolling instruction direction in response to an instruction by the operation section to scroll in the perpendicular direction and to calculate individual movement amounts of an upper, middle, and lower portions of the drawing object range upon the movement of the drawing object range based on values of the ratio for each of the upper and lower portions, with reference to the distance in the perpendicular direction at the reference position; and
a display unit configured to display a three-dimensional image based on the three-dimensional image data produced by the drawing processing unit.

12. The display apparatus according to claim 11, further comprising a position detection unit configured to detect a position of the display apparatus itself, the reference position being the position of the display apparatus itself on the map data detected by the position detection unit.

13. A drawing processing method for producing and outputting three-dimensional image data, comprising:
producing, via a processor, a three-dimensional image of a drawing object range on a map, the producing including calculating a reference position and a distance in a perpendicular direction to a viewing direction from the reference position, the producing including moving the reference position with regard to the viewing direction, the producing including producing the image using a ratio for an upper, middle, and lower portion of a display unit, the ratio being a number of display cells at a corresponding portion to a reference number of display cells;

receiving a scrolling instruction for moving the drawing object range via a physical communication interface;

moving, via a processor, the drawing object range in a scrolling instruction direction in response to the instruction from the physical communication interface to scroll in the perpendicular direction and to calculate individual movement amounts of an upper, middle, and lower portions of the drawing object range upon the movement of the drawing object range based on values of the ratio for each of the upper and lower portions with reference to the distance in the perpendicular direction at the reference position; and displaying, via the display unit, the output of the producing and moving.

14. A navigation apparatus, comprising:

a map data storage unit configured to store map data therein;

an operation unit configured to issue a scrolling instruction; a drawing processing section including a drawing unit configured to produce a three-dimensional image of a drawing object range on a map acquired from the map data storage section the unit calculating a reference position and a distance in a perpendicular direction to a viewing direction from the reference position, the drawing unit configured to move the reference position with regard to the viewing direction, the drawing unit configured to produce the image using a ratio for an upper, middle, and lower portion of a display, the ratio being a number of display cells at a corresponding portion to a reference number of display cells;

a drawing object range moving unit configured to move the drawing object range in a scrolling instruction direction in response to an instruction by the operation section to scroll in the perpendicular direction and to calculate individual movement amounts of an upper, middle, and lower portions of the drawing object range upon the movement of the drawing object range based on values of the ratio for each of the upper and lower portions with reference to the distance in the perpendicular direction at the reference position; and a display unit configured to display a three-dimensional image based on the three-dimensional image data produced by the drawing processing unit.

15. A computer readable storage medium configured to store a computer program that is described in a computer-readable form which when executed by a processor, performs the method recited in claim 13.

* * * * *